United States Patent [19]

Leini

[11] Patent Number: 5,052,314
[45] Date of Patent: Oct. 1, 1991

[54] PLANTING TUBE

[75] Inventor: Arvo Leini, Edsbyn, Sweden

[73] Assignee: Sandvik AB, Sandviken, Sweden

[21] Appl. No.: 523,533

[22] Filed: May 15, 1990

[30] Foreign Application Priority Data

May 18, 1989 [SE] Sweden .................. 8901771

[51] Int. Cl.⁵ .................. A01C 5/02; A01C 11/02
[52] U.S. Cl. ..................................... 111/106; 111/92; 111/98; 172/430
[58] Field of Search ............ 111/7.1, 7.3, 100, 106, 111/108, 89, 92, 95, 98; 172/430

[56] References Cited

U.S. PATENT DOCUMENTS

| 551,006 | 12/1895 | Simons | 111/92 |
| 551,421 | 12/1895 | Walter | 111/106 |
| 1,007,241 | 10/1911 | Schlatter | 111/92 |
| 2,216,720 | 10/1940 | Cousins | 111/7.1 X |
| 3,749,034 | 7/1973 | Bergius et al. | 111/106 |
| 4,444,131 | 4/1984 | Marttinen | 111/92 X |
| 4,706,582 | 11/1987 | Keskilohko | 111/98 X |

FOREIGN PATENT DOCUMENTS

| 822738 | of 0000 | Fed. Rep. of Germany . | |
| 10198 | of 0000 | Sweden . | |
| 369823 | of 0000 | Sweden . | |
| 36836 | 5/1914 | Sweden | 111/7.1 |
| 340723 | 11/1971 | Sweden . | |
| 407136 | 3/1979 | Sweden . | |
| 821219 | 1/1983 | Sweden . | |
| 1253447 | 8/1986 | U.S.S.R. | 111/106 |

Primary Examiner—Dennis L. Taylor
Assistant Examiner—Jeffrey L. Thompson
Attorney, Agent, or Firm—Burns, Doane, Swecker & Mathis

[57] ABSTRACT

A planting tool for plants comprises a tube having a fixed beak half at its lower end. A hinged beak is hinged to the tube such that the fixed and hinged beak halves together form a beak capable of being pressed into the ground. The beak is then opened to make a hole in the ground for the plant, and is latched in the open position by the drawbar of a latching mechanism. The drawbar is attached to the hinged beak half and arranged to slide along an outside surface of the tube as the beak is opened and closed. The drawbar slides within a protective rail that is affixed to the outside of the tube to avoid being damaged or obstructed. The upper end of the drawbar extends above a reference edge of the rail when the beak is closed, and extends below that edge when the beak is open, thereby providing a visual indication of the condition of the beak. A handle for lifting and aiming the tube is adjustably attached to the rail to be adjustable to the height of the operator.

7 Claims, 2 Drawing Sheets

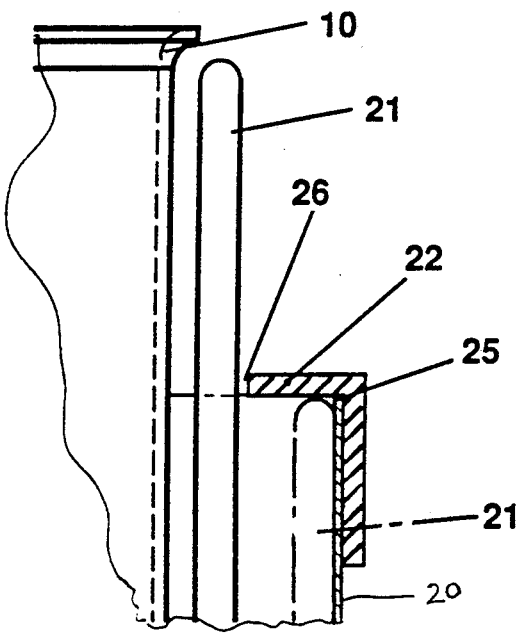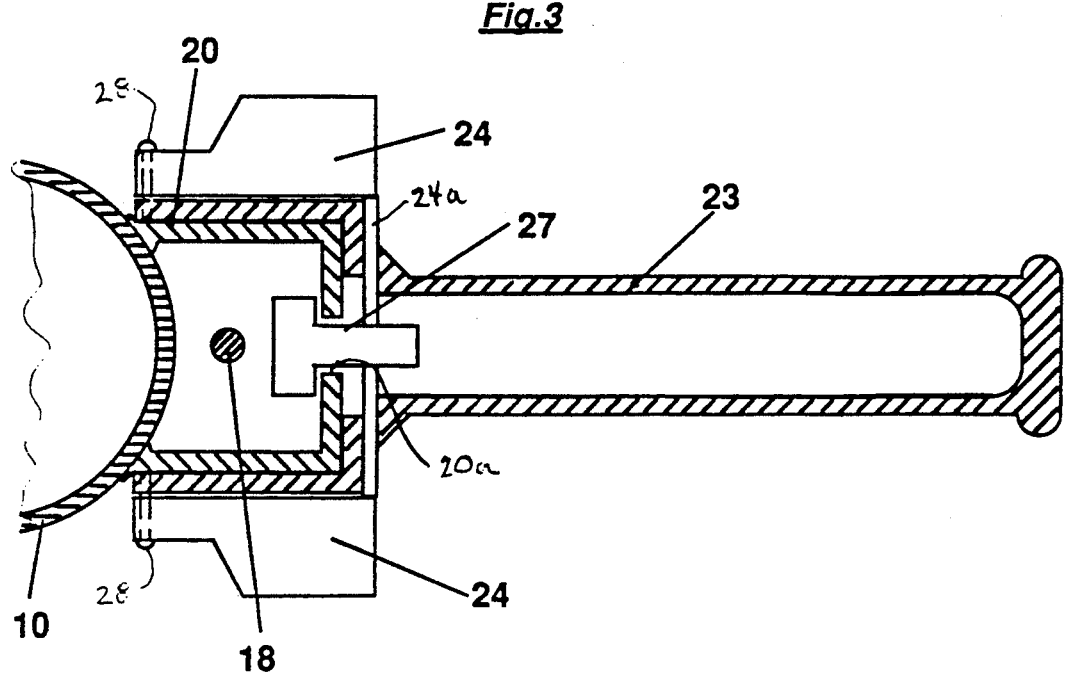

PLANTING TUBE

BACKGROUND OF THE INVENTION

For manual planting of plants such as trees, a tube-shaped tool is commonly used, first to make a planting hole in the ground, then to locate a tree plant in the hole, after which the tube is lifted up without disturbing the plant. Planting tubes are often constructed with a pointed lower end which can be opened like the beak of a bird. The pointed beak is closed when the hole in the ground is initially made, and opened when the plant is dropped through the tube and when the tube is thereafter lifted.

Previously known manually actuable planting tubes have certain disadvantages, which on one hand make them inefficient in use, and on the other hand subject some parts of the planting tube to unnecessary strain. The present invention is an improved planting tool for use in a similar manner to previous tools, but with improved performance in those respects.

RELATED ART

Several prior planting tools of the type mentioned have an opening mechanism, which opens the beak when the foot of the operator presses a pedal facing rearwardly towards the operator, as shown in U.S. Pat. Nos. 3,749,034 and 4,706,582, causing a hinged half of the beak to loosen the soil and push it forward. One disadvantage with this arrangement is that the beak can be opened even when it is not fully pressed down to the intended depth in the ground, leaving the plant in such a shallow hole that it will dry out. Another disadvantage is that the bearings of the hinged half of the beak are severely strained in hard or stonebound ground.

Another known mechanism is shown in German Patent 822,738 and Swedish Design Patent M 82-1219, where the soil is loosened and pushed away by the fixed half of the beak by tilting the whole tube, while the hinged half of the beak is kept in place by a plate pressing against the soil surface. Such a mechanism prevents the beak from opening too soon.

With both of the above-described types of opening mechanism, it is desirable that the hinged half of the beak be latched in its fully open position while the tube is lifted from around the plant in order to avoid damaging the plant or pulling it up. The known latch mechanisms use an operating rod openly located on the outside of the tube, where the rod can be easily damaged in transport and easily blocked by twigs and debris. Also, the rod does not clearly indicate if the tube has been pressed down deeply enough or if the beak is latched in open position.

SUMMARY OF THE INVENTION

The present invention relates to a planting tool with an improved latching mechanism, which is protected from damage, and which clearly indicates the beak open/closed status. Also, the tool can be adjusted to accommodate operators of different height.

BRIEF DESCRIPTION OF THE DRAWING

The objects and advantages of the invention will become apparent from the following detailed description of preferred embodiments thereof in connection with the accompanying drawings in which like numerals designate like elements, and in which:

FIG. 2 is a vertical section through an upper end of the latching rail; and

FIG. 3 is a horizontal section taken through the handle along the line 3—3 in FIG. 1.

DETAILED DESCRIPTION OF PREFERRED EMBODIMENTS OF THE INVENTION

Figure 1:
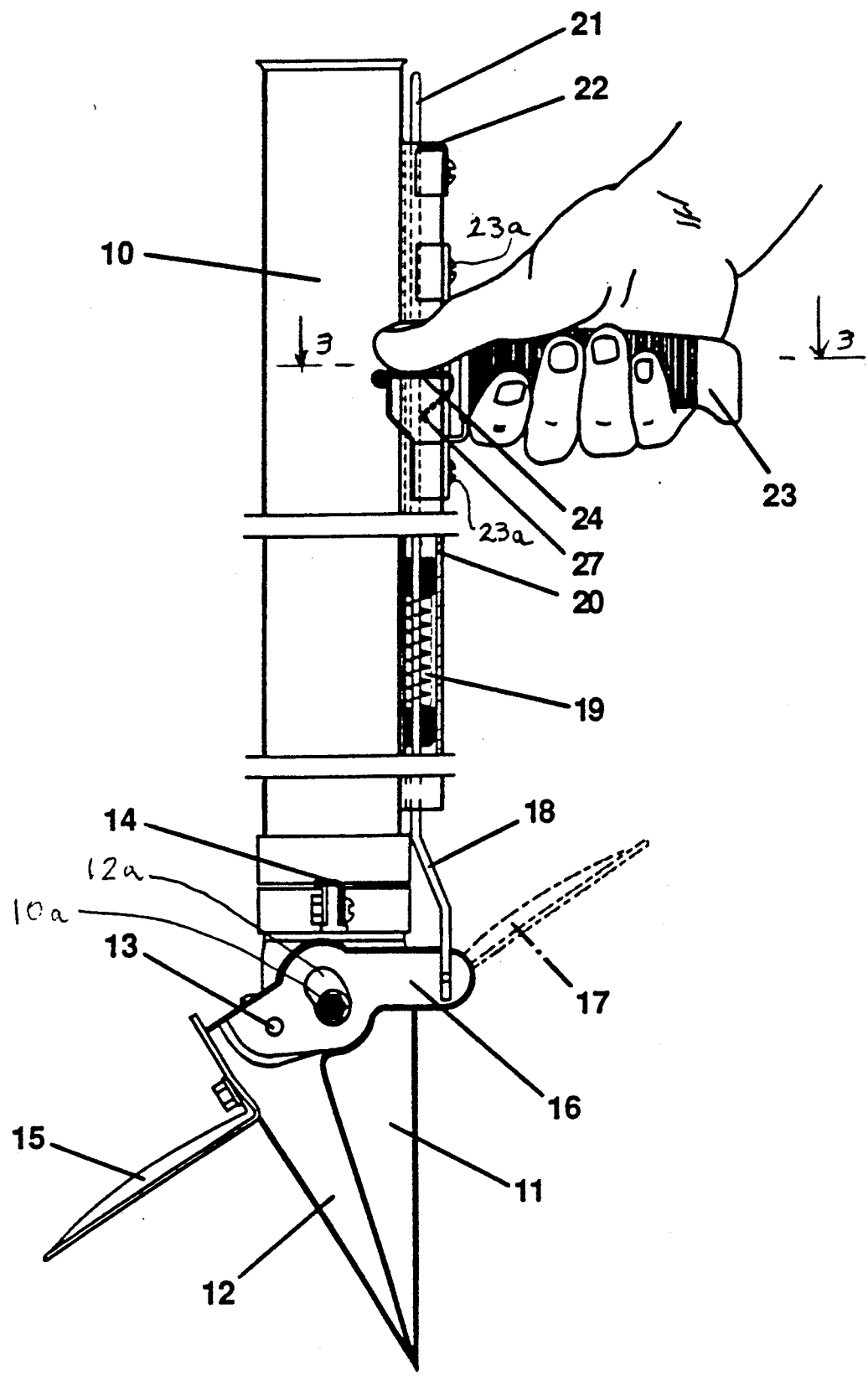
FIG. 1 is a side elevational view of a planting tool according to the invention, with a portion of a protective rail being shown in vertical section to expose a spring.

The planting tool comprises an upwardly open tube 10 of such a diameter that a plant will fall unaidedly through it by its own weight. A beak half 11 is fixedly attached to the lower end of the tube, and a hinged beak half 12 is hingedly attached to the tube by a shaft 13. At least one foot plate 14 rigidly extends from the tube in a direction parallel to the shaft 13.

Joined fixedly to the hinged beak half are a lever 16 pointing towards the operator and a ground plate 15 normally pointing away from the operator. Alternatively, the ground plate 15 could be replaced by a pedal 17 connected to the hinged beak half and pointing towards the operator. The lever 16 is connected to a drawbar 18 which is pulled upwards by a spring 19. The drawbar 18 is surrounded by a vertical protective rail 20 attached along an outside surface of the tube 10 to prevent damage to the drawbar and blocking of the motion of the drawbar 18 by twigs or debris. The rail is preferably U-shaped in cross-section (see FIG. 3). The drawbar 18 is preferably made such that its upper end 21 has a free equilibrium position spaced some distance from the outside surface of the tube either because of a slight elastic curvature of that upper end or because of the action of a separate spring (not shown).

An angular latch restraint 22 is attached to the upper end of the rail 20. In a lower position of the drawbar 18, corresponding to a fully open beak, an upper end 21 of the drawbar does not extend above a reference edge 26 of the restraint 22, but rather rests against an inside corner 25 of the restraint under the influence of the spring 19 in order to latch the beak in the open condition. When the beak is partly or fully closed, the upper end 21 of the drawbar will extend above the restraint 22 by extending through an opening formed between the tube 10 and the inner reference edge 26 of the restraint. The upper end 21 of the drawbar will then be visible outside of the rail 20 and is painted in a striking warning color, indicating to the operator that the tube must not be lifted from the plant.

A handle 23 is attached to the rail 20 by screws 23a. By loosening those screws, the handle 23 can be slid vertically relative to the tube to enable the tool to be adjusted to the height of the operator.

Pivotably mounted on the handle 23 by means of pivot pins 28 is a trigger 24 which includes a bridge portion 24a carrying a tongue 27. When the trigger is rotated downwardly by the thumb of the operator (i.e., rotated clockwise in FIG. 1), the bridge moves horizontally within a slot (not shown) formed between the rail 20 and the handle 23 whereby the tongue 27 presses the drawbar 18 towards the tube 10. This allows the upper end 21 of the drawbar to move upwardly past the edge 26 of the restraint 22 under the action of the spring 19 which closes the beak. The trigger 24 is symmetrical, i.e., has thumb-contacting portions at each side of the rail, to permit holding of the handle 23 with a right or left hand. The rail 20 contains a vertical slot 20a which permits vertical movement of the tongue 27 when the handle 23 is adjusted.

OPERATION OF THE INVENTION

For planting a tree plant the beak shall initially be closed with the fixed beak half 11 in tight contact with the hinged beak half 12. This is indicated to the operator by the visible warning color of the exposed upper end 21 of the drawbar. With one foot on the foot plate 14 and the lower end of the tube 10 pointing slightly forward, the beak is pressed into the ground so deeply that the ground plate 15 touches the soil surface. Then, the upper end of the tube with the handle 23 is moved forward by the operator to a vertical position. In so doing, a guide pin 10a affixed to the fixed beak half rides in a curved guide slot 12a formed in the lever 16. The fixed beak half 11 thereby loosens some soil towards the operator to make a planting hole. The ground plate 15 prevents the hinged beak half 12 from taking part in this motion, resulting in opening of the beak when the fixed beak half 11 moves. When the tube has been brought so far forward that the beak is fully open, the upper end 21 of the drawbar will have been pulled downwardly below the edge 26 of the restraining 22 and the drawbar 25 of the restraint, thereby latching the beak in the open position. This is indicated by the warning color of the upper end 21 becoming hidden by the restraint, and/or by the sound of the upper end 21 striking the corner 25.

The plant is then dropped through the tube and into the hole. The operator may then check to verify that the upper indicator portion of the drawbar is still not visible, indicating that the planting tube can be lifted without damaging the plant. Thereafter, the soil loosened by the fixed beak half 11 on the side of the hole towards the operator can be compacted with the foot. By pressing the trigger 24 with the thumb, the upper end 21 of the drawbar is freed from the corner 25 of the restraining 22, causing the beak to close and making the warning color visible once again.

For those who prefer a different mode of operation, the ground plate 15 can be removed and replaced by a pedal 17 attached to the hinged beak half and pointing towards the operator. In this mode the beak is pressed into the ground by the pressure of the foot on the foot plate 14 with the tube vertical, whereupon the beak is opened by depressing the pedal 17 until the beak is fully open. In this mode, the loosened soil is on the far side of the hole away from the operator, who has to take a step obliquely forward before being able to compact the soil with the foot.

A planting tube according to the invention can be made from metal or plastics in a known manner. The fixed beak half and the rail can be made integral with the tube, or separately fabricated.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A manually actuable planting tool for plants comprising a tube, a lower end of said tube including a fixed beak half, a hinged beak half being hingedly mounted to said tube such that said fixed and hinged beak halves together define a beak adapted to be inserted into the ground to form a hole therein, said beak being openable in response to relative rotation between said fixed and hinged beak halves to enable a plant to be dropped through said tube end into said hole, a handle attached to said tube for lifting and aiming said tube, at least one foot plate attached to said tube for pressing said beak into the ground, a releasable latching mechanism operably connected between said tube and said hinged beak half for releasably latching said beak in its open position to allow said device to be lifted from the ground without damaging the plant, said latching mechanism including a drawbar arranged to slide along and relative to said tube, said tube carrying a protective rail in which said drawbar slides, said rail including a reference edge located adjacent an upper end of said rail, said drawbar being of such a length that an upper end of said drawbar extends upwardly beyond said reference edge when said beak is closed, and extends below said reference edge when said beak is open, whereby said upper end of said drawbar constitutes an indicator of beak-open and beak-closed conditions.

2. A tool according to claim 1, wherein said indicator is distinctively colored to be readily visible.

3. A tool according to claim 1, wherein said upper end of said rail includes a restraint member arranged to contact and latch said upper end of said drawbar in a beak-open condition.

4. A tool according to claim 3, wherein said restraint member defines said reference edge which is spaced from an outer surface of said tube to define therewith an opening through which said upper end of said drawbar extends in a beak-closed condition.

5. A tool according to claim 4, wherein said handle carries a trigger for releasing said latching mechanism.

6. A tool according to claim 1, wherein said handle carries a trigger for releasing said latching mechanism.

7. A tool according to claim 1, wherein said handle is vertically adjustably connected to said tube.

* * * * *